Feb. 28, 1939. W. M. ORR 2,148,708

FIBROUS FILTERING MEDIA

Filed May 18, 1937

Inventor
William M. Orr,
By Smith, Michael and Jardine
Attorneys

Patented Feb. 28, 1939

2,148,708

UNITED STATES PATENT OFFICE 2,148,708

FIBROUS FILTERING MEDIA

William M. Orr, Washington, D. C.

Application May 18, 1937, Serial No. 143,385

8 Claims. (Cl. 210—204)

This invention is a fibrous filter medium suitable for efficient use in connection with fluids, either liquid or gaseous.

It has heretofore been proposed to use fibrous filter media but in many instances these media have proved to be impractical, particularly in instances where it is necessary to continually filter, over long periods of time, fluids containing appreciable solid contents, because it has proved impractical to design the filter media with respect to rigidity, density, porosity and permeability to give the desired degree of efficiency over long periods of use. In practice the known fibrous filter media become prematurely clogged with sediment from the fluid passing therethrough, due to insufficient permeability, or the initial periods of operation of the filters were characterized by relatively poor performance, due to excessive permeability and the resultant passing of appreciable quantities of the deleterious solids.

Another respect in which the known fibrous filter media have been impractical is in their inability to retain their form and shape after becoming saturated with the filtrate, the result being a substantial loss of permeability, and stoppage of flow.

One instance in which fibrous filtering media have proved to be strikingly impractical is in the filtration of engine lubricating oils by pressure filters incorporated in the lubricating system.

After extensive experimentation and investigation with various types of fibers and the manner of arranging or fabricating them into filtering media of various forms, I have concluded that the failure of known fibrous filtering media to function efficiently under the conditions noted, is probably due to the fact that in most of the prior art filters of a fibrous nature known to me, the fibers have been scattered promiscuously through the body of the medium, lying in all directions and entangled, entwined and interlaced one with the other indiscriminately. Furthermore, filtering media of the prior art have been characterized by a relatively large percentage of individual, small size fibers which render them susceptible to premature clogging, and the total absence of fiber structure designed to properly maintain the desired degree of permeability when saturated.

I have discovered that the most efficient fibrous filtering media comprises a coarse, fibrous mat in which an appreciable portion of the fibers are present as visible groups or bundles of fibers in contradistinction to the individual fibers which characterize prior art filter media and ordinary paper. Furthermore, in order to provide the proper degree of permeability the large fibers or bundles of fibers should preferably be disposed in planes parallel to the direction of fluid flow through the filtering media, in contradistinction to the heterogeneous arrangement of fibers in the fibrous filtering media of the prior art.

A practical fibrous filtering media should furthermore be characterized by a percentage of relatively fine or small fibers sufficient to effectively bond or tie together the large fiber bundles previously referred to. By thus proportioning and arranging the fibers the density of the media may be conveniently controlled to give any desired degree of porosity and rigidity.

With the foregoing facts in mind, I have devised a fibrous filter medium which will operate over long periods of time and continue to effectively remove deleterious solid particles from fluids, either liquid or gaseous. The fibrous media of my invention have proven to be most effective in clarifying insulating oils and engine lubricating oils, and maintain the same free of sludge over long periods of use.

In the accompanying drawing I have illustrated preferred forms of my invention, but it is to be understood that these are but for the purpose of example only and that such changes in design and combination of parts may be made as fairly fall within the scope of the appended claims without departing from the spirit of the invention.

Figure 1:
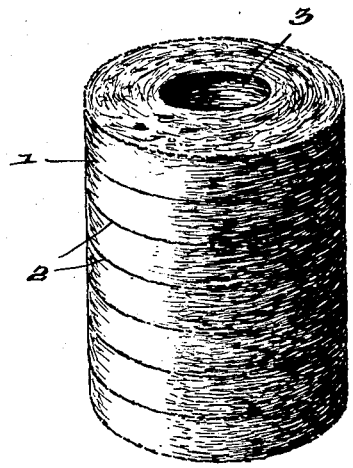
Figure 1 is a perspective view of one form of my fibrous filter.
Figure 3:
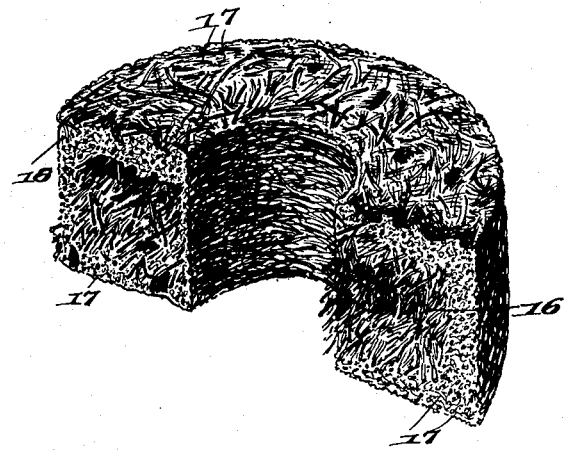
Fig. 3 is a perspective view of a fragment of fibrous mat comprising my filter medium.

Referring more particularly to the accompanying drawing, wherein like reference numerals designate like parts throughout, Fig. 1 shows a filtering element or cartridge comprising a plurality of superposed disks or sheets 1 of coarse fiber filter mat, such as shown in Fig. 3. The disks or sheets 1 are designed to provide a substantially cylindrical unit or cartridge, but obviously they can be made in any desired configuration without departing from the spirit of the invention. The individual disks or sheets are adhered to each other in superposed relation by any suitable adhesive such as indicated at 2. The disks or sheets 1 are each provided with a central aperture so that when superposed one upon the other and secured in such position a central hollow bore 3 is provided.

Figure 2:
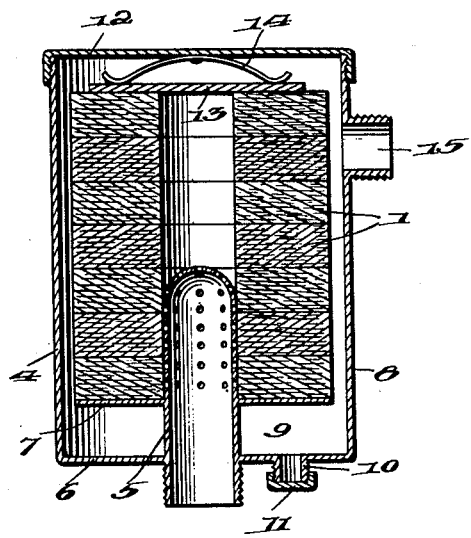
Fig. 2 is a sectional view showing the filtering element of Fig. 1 within the filter unit.

The unit or cartridge shown in Fig. 1 is designed for use in a filter unit such as shown in Fig. 2 and comprising a casing 4 open at its upper end and provided centrally at its lower end with an upstanding perforated outlet pipe 5. Supported upon the outlet pipe 5 in spaced relation to the bottom wall 6 of the container 4 is a baffle plate 7 dimensioned so that its periphery terminates in spaced relation with the side wall 8 of the container 4. This construction provides a compartment 9 in the lower part of the container 4 which serves as a sump or sediment chamber which may be drained through a nipple 10 normally closed by a plug or cap 11. The cartridge or filtering unit of Fig. 1 is disposed within the container 4 upon the baffle plate 7 with the outlet pipe 5 entered in the hollow bore 3 of the cartridge. The container 4 is closed by a suitable cap 12 screw-threaded or otherwise detachably secured to the side wall of the container, and interposed between the cap 12 and the top of the cartridge is a sealing plate 13 which may be spring-pressed against the top of the cartridge by a suitable spring 14 carried by or interposed between the cover 12 and the plate 13. The container 4, as shown, is provided with a side wall inlet 15 through which material to be filtered is admitted to the interior of the container 4. The material thus admitted to the container passes edgewise through the several disks 1 and into the hollow center or bore 3, thence out through the perforations in the outlet pipe 5.

As hereinbefore indicated, the disks or sheets 1 comprising the cartridge shown in Fig. 1 are preferably made from coarse fiber mats of the character shown in Fig. 3. The fibers comprising the coarse mat may be wood or vegetable fibers such as sugar cane, bagasse, corn stalks, ground wood and the like, and as hereinbefore suggested, are characterized by a relatively large percentage of visible, unbroken fiber bundles in contradistinction to the fiber pulp from which paper is made. Thus, as shown in Fig. 3, the relatively large content of unbroken fiber bundles is clearly visible at 16. It will be noted that these large fibers or groups of fibers lie substantially parallel to the upper and lower faces of the disk or sheet in which they are embodied so that they lie substantially with their long axes in the plane of flow of fluid through the mat. This particular disposition of the large and visible fiber bundles is clearly shown at the upper face of the mat of Fig. 3, as indicated at 17. Smaller fibers such as indicated at 11, and which for the most part are individual fibers of short length in contradistinction to the unbroken fiber bundles of appreciable length, make up the remainder of the fiber mass comprising the mat, and as shown in Fig. 3, are heterogeneously arranged and function to effectively and securely bond the large visible fiber bundles together.

In the mat shown in Fig. 3 it will be noted that the exposed edges of the mat surrounding the areas characterized by the presence of the protruding large fiber bundles 16, show the severed ends 18 of the large fibers, it being noted that the fiber mat was partly cut through to better define a line of cleavage, and this accounts for the difference in appearance between the fibers as shown at 16 and 18.

In making the fiber mats it has been found difficult, although not impractical, to properly control the disposition of the fibers and secure proper bonding thereof for mats exceeding an inch or an inch and a half in thickness. It is therefore proposed to make the mats of a thickness approximating one-half inch to an inch, and by superposing a plurality of disks or sheets such as shown in Fig. 1, cartridges or filtering units of any desired dimensions may be made and still have the assurance that the fibers throughout the unit are disposed in the manner hereinbefore described and which has been found to yield such admirable results.

Furthermore, this construction makes for a more substantial cartridge, than could be made from a unitary fiber mat of a thickness corresponding to the height of the cartridge, and definitely insures maximum permeability over long periods of use by fortifying the unit against loss of form and shape when saturated.

It has been stated that course fiber mats of the character described can be fabricated having desired characteristics of rigidity, density, porosity and permeability so that they may be made to operate efficiently over long periods of time with fluids of different densities. In filtering lubricating oils such as where a pressure filtering unit is incorporated in the lubricating system of an engine, it has been determined that a desirable permeability is one such that S. A. E. No. 30 oil at 75° F. and under ten pounds pressure will pass through a filter mat of the character described having surface area of one square foot and a thickness of one inch at a rate not less than one quart in thirty minutes nor greater than one quart per minute. For oils having different SAE numbers the permeability may be varied by varying the degree of pressure with which the mat is compacted during manufacture. Thus, by applying less pressure during manufacture the fibers are less densely compacted and a greater degree of permeability results. Conversely, by compacting the fibers more tightly, a lesser degree of permeability may be provided in the mat without otherwise changing its characteristics.

Similarly, it is desirable to have the coarse fiber mats possess a degree of rigidity such that they may be readily worked and handled while dry and be self-sustaining when saturated with liquid being filtered. This makes it possible to quickly replace a fouled cartridge with a clean one without appreciably interrupting service.

The coarse fiber mats of my invention are further characterized by a density such that a cubic foot of the mat will range in weight between 5 and 17 pounds depending upon the degree with which the board has been compacted or compressed. Thus, considering the fibers from which the mat is made would have a specific gravity of substantially 1.55 (for all vegetable fibers), the mats falling within the weight range just specified will be characterized by a percentage of from 50 to 95 percent of air voids.

In my investigations I have found that some of the insulating boards at present available on the open market have the necessary characteristics to render them suitable for use as filter media within the teachings of my invention. Among the available boards made of vegetable fibers and suitable for use as filtering media are the following: "Celotex", a product of the Celotex Corp.; "Weatherwood", a product of the U. S. Gypsum Co.; and "Insulite", a product of the Insulite Corp. These boards are all characterized by the presence of coarse ground fiber pulp which is coarser than that used in the manufacture of paper and previously known fibrous filter media and having appreciable percentages of coarse, visible fiber bundles of appreciable length. In all cases the large fibers or groups of fibers cross each other at various angles but all tend to lie with their long axes parallel to the surfaces of the boards. Thus, disks cut from insulating boards of this type, such as the disks 1 comprising the cartridge of Fig. 1, have the long fibers lying in planes parallel to the direction of flow of the fluid through the cartridge when positioned within a container such as shown in Fig. 2.

Furthermore, the fibrous boards of the type referred to have a sufficient rigidity and are self-sustaining when saturated with oil or other fluid being filtered to render cartridges or filtering units made therefrom readily removable and interchangeable in service.

Figure 4:
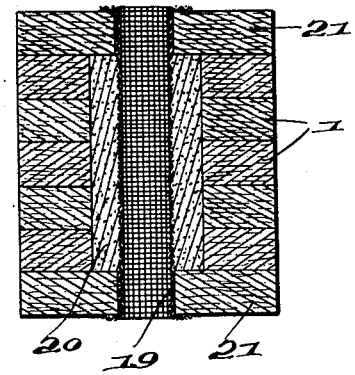
Fig. 4 is a sectional view of a modified form of filter unit.

In Fig. 4 I have shown a slightly modified form of filtering unit or cartridge in which the coarse fiber mat disks are superposed in the same manner shown in Fig. 1, but wherein I provide a central core in the form of a reticulate screen 19. The screen core 19 is appreciably smaller in diameter than the holes or apertures in the disks 1 in order to provide an inner annular space between the core 19 and the inner surfaces of the apertures in said disks 1. The annular space is filled with a suitable bleaching or decolorizing clay 20 which may be any of the well known fuller's earths, such as Floridan, or it may be an acid-treated clay such as that sold under the trade name "Filtrol". The screen core 19 is centered within the cartridge by providing the end disks 21 with apertures conforming substantially in diameter to that of the screen 19. The ends of the screen may be bent or crimped over upon the outside surfaces of the disks 21 to retain the same in place. The disks 1 and 21 are all secured and adhered to one another by suitable adhesive similar to the manner in which the cartridge shown in Fig. 1 is made. The unit shown in Fig. 4 is highly efficient in that the combined fiber mat disks 1 and 21 and the central annular sleeve of bleaching or decolorizing clay 20 cooperate to remove substantially all of the solid particles which contaminate the fluids being filtered. Thus, the coarse fiber mat disks remove the bulk of the contaminating solids including all of the large particles, whereas the bleaching clays tend to improve the color of the fluid and remove by adsorption any of the finer particles which have passed through the mat.

While I have mentioned in connection with the cartridge of Fig. 4 an annular sleeve of clay 20, it is of course within the spirit of my invention to fill the annular space between the disks 1 and the core 19 with any material designed to perform a desired function on and with respect to the filtrate. Thus I may employ bone black or charcoal which are particularly desirable when filtering syrups and similar liquids. Or in instances where a gaseous fluid is being filtered it may be desirable to employ calcium chloride or other like drying agent.

Furthermore, the nature of my coarse fiber mat filter media makes possible the treatment of the fibers either before or after being made into mat form, with any known chemical solution designed to enhance the purely mechanical action of the mat. Thus the fibers or mats may be treated with a solution of calcium chloride for drying gaseous filtrates, or with various given solvents when it is desired to remove gums present in liquid filtrates.

From the foregoing it is apparent that I have invented a filtering medium comprising a coarse fiber mat having the following characteristics:

1. Visible groups or bundles of unseparated fibers lying with their long axes in planes substantially parallel to the planes of fluid flow through the mat.

2. A mat of the character described in paragraph 1 and having a density such that a cubic foot of the mat will range in weight between 5 and 17 pounds.

3. A mat of the character described in paragraph 1 and having air voids up to between 50 and 95 percent by volume.

4. A mat of the character described in paragraph 1 having a permeability such that S. A. E. oil No. 30 at 75° F. and under ten pounds pressure will pass through a filter mat having an area of one square foot and a thickness of one inch at a rate not less than one quart in thirty minutes nor greater than one quart per minute.

5. A filter medium of the character described in paragraph 1 which is substantially rigid when dry and self-sustaining when saturated with fluids being filtered.

6. A filter medium made from vegetable fiber insulation wall board.

It will be appreciated that by superposing a plurality of disks or sheets of a fiber mat of the character described, to form units such as shown in Figs. 1 and 4, I provide a cartridge which may be readily inserted or removed from a filter vessel or receptacle such as shown in Fig. 2, and that the lines of adherence formed by the adhesive by which the several disks are secured one to the other, define impermeable planes substantially parallel to the direction of fluid flow whereby to restrict the flow of fluid through the cartridge in a direction substantially parallel to the planes occupied by the long axes of the groups or bundles of unseparated fibers hereinbefore referred to.

The coarse fiber mats of my invention have the added advantage of reducing the acidity of engine lubricating oil. Test data in respect to this feature lead me to believe that the reduction in acidity is due not only to a substantially complete removal of the deleterious sludge but also to some chemical reaction between the acid in the oil and the cellulose in the fiber mat which tends to neutralize the acid.

It is to be noted that whereas I have referred specifically to the use of my improved filter media for use in connection with filtering lubricating oils in engines and the like, it is also apparent that the fibrous filter mats of this invention are capable of efficient use in connection with insulating oils, particularly such as used in transformers and similar electrical apparatus and which must be maintained free from sludge to retain their requisite insulating properties.

Having thus described my invention, what I claim as new and desire to secure by Letters Patent is:

1. A filter medium comprising a coarse fiber mat characterized by visible groups or bundles of unseparated fibers and relatively small individual fibers interlaced with the unseparated bundles of fibers and supporting the same substantially throughout the full length thereof.

2. A filter medium comprising a coarse fiber mat characterized by visible groups or bundles of unseparated fibers disposed with their long axes in planes substantially parallel to the direction of fluid flow through the mat and relatively smaller individual fibers disposed transversely of said bundles or groups of unseparated fibers and interlaced therewith and supporting the same substantially throughout the full length thereof.

3. A filter medium comprising a coarse fiber mat characterized by visible groups or bundles of unseparated fibers disposed with their long axes in planes substantially parallel to the direction of fluid flow through the mat, and bonded together by relatively smaller individual separated fibers heterogeneously disposed within the body of the mat and interlaced with each other and said groups or bundles of unseparated fibers.

4. A cartridge for a pressure filter comprising a stack of coarse fiber mats, said mats having their contacting surfaces secured together by adhesive defining impermeable planes of division between the mats, said mats being characterized by visible groups or bundles or unseparated fibers having their long axes disposed in planes substantially parallel to said impermeable planes.

5. A cartridge for a pressure filter comprising a stack of coarse fiber mats, said mats having their contacting surfaces secured together by adhesive defining impermeable planes of division between the mats, said mats being characterized by visible groups or bundles of unseparated fibers having their long axes disposed in planes substantially parallel to the direction of fluid flow through the cartridge.

6. A filtering cartridge for pressure filters comprising a stack of superposed apertured disks of coarse fiber mat, the apertures of the superposed disks defining a central bore within the cartridge, a reticulate screen core within said bore in spaced relation to the inner surfaces of the apertures of the superposed disks, and an annular layer of bleaching clay disposed between the reticulate screen and said disks.

7. A cartridge for pressure filters comprising a stack of superposed apertured disks cut from insulating fiber board, said board being characterized by visible groups or bundles of unseparated fibers disposed substantially parallel to the faces of said board, the ends of said fiber bundles being exposed at the edges of the disks.

8. A filter medium comprising a coarse fiber mat characterized by visible groups or bundles of unseparated fibers disposed with their long axes in planes substantially parallel to the path of fluid flow through the mat, the ends of said groups or bundles of unseparated fibers being exposed at opposite edges of the mat, said groups or bundles of unseparated fibers being supported substantially throughout their length by relatively smaller individual separated fibers interlaced therewith.

WILLIAM M. ORR.